United States Patent [19]

Fung

[11] Patent Number: 5,144,020
[45] Date of Patent: Sep. 1, 1992

[54] HIGH PRODUCTIVITY SPHEROID NITROCELLULOSE

[75] Inventor: Kwan F. Fung, Middletown, N.J.

[73] Assignee: Aqualon Company, Wilmington, Del.

[21] Appl. No.: 701,755

[22] Filed: May 17, 1991

[51] Int. Cl.$^5$ .................... C08B 5/02; C08B 5/04
[52] U.S. Cl. ........................ 536/35; 536/38; 536/41; 523/223
[58] Field of Search ............... 536/35, 38, 41; 523/223

[56] References Cited

U.S. PATENT DOCUMENTS

| | | | |
|---|---|---|---|
| 2,915,519 | 12/1959 | Stewart et al. | 536/38 |
| 3,325,315 | 6/1967 | Sapiego | 536/39 |
| 4,582,901 | 4/1986 | Prestwich | 536/58 |

*Primary Examiner*—Nathan M. Nutter
*Attorney, Agent, or Firm*—James K. Luchs

[57] ABSTRACT

Fibrous water-wet nitrocellulose containing 4.5 to 5.5% moisture sprayed with a solvent/cosolvent mixture converts to spheroid, densified nitrocellulose via bilateral agitation. A free-flowing dust-free product having a lower burn rate is produced which dissolves more rapidly for lacquer production. A preferred apparatus is an orbital shaker and a preferred solvent/cosolvent is isopropyl acetate/isopropyl alcohol.

9 Claims, 3 Drawing Sheets

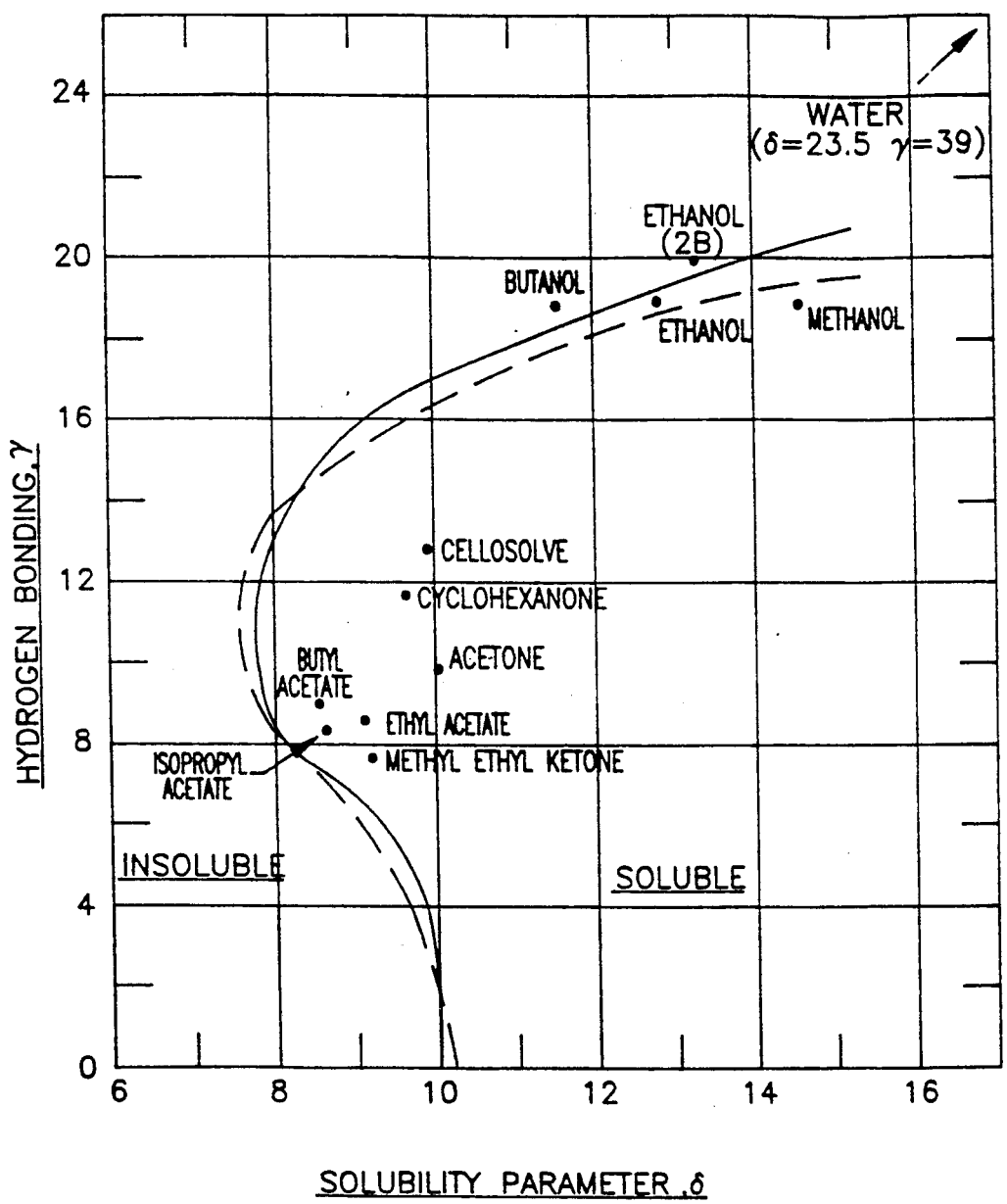

HIGH PRODUCTIVITY SPHEROID NITROCELLULOSE

FIELD OF THE INVENTION

The invention relates to an improved nitrocellulose product. In particular, the invention relates to a spheroid nitrocellulose with improved performance and safety features.

BACKGROUND OF THE INVENTION

Industrial nitrocellulose is available in various grades of nitration, i.e., high 11.8–12.2% and medium 11.2–11.8% and low 10.8–11.2%.

For over 30 years the production of nitrocellulose has not experienced many significant changes. British Pat. 336,235 to Imperial Chemical Industries Limited (ICI) describes a method of cutting cellulose into pieces prior to the nitration process such that the nitrocellulose produced thereby has good bulk flow properties. U.S. Pat. No. 2,028,080 to Hercules Powder Co. describes the preparation of a fibrous, form of nitrocellulose. British Pat. 1,175,607 to Nitrochemie Gesellschaft discloses that compacted and pourable nitrocellulose can be produced by moistening alcohol wet nitrocellulose with a solvent/plasticizer mixture and kneading to increase bulk density from 120 g/l up to 365 g/l. U.S. Pat. No. 3,284,253 to Hercules Incorporated discloses the steps of heating nitrocellulose, treating with a solvent, distillation of solvent, separating excess water, displacing absorbed water and recovering nitrocellulose granules. U.S. Pat. No. 3,325,315 to Hercules Incorporated discloses the production of a spheroid form of nitrocellulose by the steps:

(a) forming a slurry with agitation of nitrocellulose fibers which are substantially free of water and also substantially free of fiber aggregates in a volatile organic liquid mixture of hydrocarbon diluent and nitrocellulose solvent in the absence of a water-soluble protective colloid;

(b) the organic liquid mixture being only a softening and swelling agent for the nitrocellulose fibers;

(c) subjecting the resulting slurry of nitrocellulose fibers to high shear agitation, whereby the fibers become softened and swollen and break down into tiny, smooth-surfaced, rounded particle;

(d) initiating hardening of the resulting shaped particles of softened and swollen nitrocellulose by diluting the slurry with hydrocarbon diluent while continuing high shear agitation; and (e) removing substantially all the nitrocellulose solvent by distillation in the presence of excess hydrocarbon diluent to complete hardening and densification of the nitrocellulose particles.

U.S Pat. No. 3,324,572 to Hercules Incorporated discloses a densification process for nitrocellulose in which a water-soluble polymer is used such as a cellulose ether. British Pats. 1,000,876 and 1,051,561 to ICI describe plasticized nitrocellulose. U.S. Pat. No. 3,985,691 to Societe Nationale Des Poudres et Explosives discloses a particulate nitrocellulose composition comprising 10 to 30% by weight of a hydroxylic plasticizer containing at least one free hydroxyl group capable of reacting with an isocyanate group. U.S. Pat. No. 4,590,019 to Wolff Walsrode describes producing free-flowing nitrocellulose using a screw-extruder.

However, despite the considerable effort as evidenced by the patent literature, ease of handling and safety consideration for solid nitrocellulose had remained a long sought after property prior to the present invention.

SUMMARY OF THE INVENTION

The invention provides a free flowing densified nitrocellulose having a spheroid form.

It is an object of the invention to provide a process for converting fibrous nitrocellulose to a free flowing form, characterized in that the process comprises the steps:

(1) removing water from a water and fibrous nitrocellulose mixture of water-wet nitrocellulose until a moisture content of from 2.5 to 10.0 percent by weight is obtained based on the weight of fibrous nitrocellulose;

(2) adding a liquid solvent/cosolvent mixture as a means for conversion of the resultant mixture from fibrous to spheroid form; and (3) using a means for bilateral agitation wherein conversion from fibrous to spheroid form occurs to produce a nonfibrous, densified nitrocellulose with improved flow properties and extended burn time in comparison with an alcohol-wet nitrocellulose.

A preferred solvent/cosolvent mixture is isopropyl acetate/isopropyl alcohol and a preferred means for bilateral agitation is an orbital shaker.

BRIEF DESCRIPTION OF THE DRAWINGS

FIG. 3 Two grade nitrocellulose phase diagram.

DETAILED DESCRIPTION OF THE INVENTION

Suitable solvents are common esters and ketones. Cosolvents for nitrocellulose are usually alcohols. Aliphatic and aromatic solvents are diluents for nitrocellulose.

It has been discovered that an improved spheroid form of densified nitrocellulose can be produced from nitrocellulose having a moisture content between 2.5 to 10.0% (4.5 to 5.5% preferred) using bilateral agitation of a solvent/cosolvent treated fibrous form. Unexpectedly, this novel nitrocellulose exhibits a higher dissolution rate and slower burning rate than alcohol wet nitrocellulose. Further, the higher bulk density allows more product to be packed for shipping while still enabling the product to flow freely due to the spheroid shape. It was further discovered that:

(a) 10% moisture in nitrocellulose is the limit beyond which the method of the invention becomes impractical because agglomeration cannot take place; and (b) agglomeration occurs through a two step process. First the nitrocellulose becomes soft and tacky upon contact with a partial solvent, then it is compacted and shaped by an external force through shaking. The partial solvent can be a pure component (i.e., 2B alcohol) or a solvent/co-solvent mixture (i.e., isopropyl acetate/isopropyl alcohol) having the corresponding solubility parameter and hydrogen bonding index lying between the soluble and insoluble regions on the respective nitrocellulose phase diagram. Therefore, any solvent/co-solvent system will work as long as the mixture meets the criteria in terms of solubility parameter and hydrogen bonding index.

While it would not have been possible to predict the mechanism and improvements provided by the present invention from thermodynamic first principles, it is now possible to apply scientific prediction to what has been empirically observed. The comparisons with the prior art and the parameters of operability are better understood by reference to the figures.

DETAILED DESCRIPTION OF THE DRAWINGS

Figure 1:
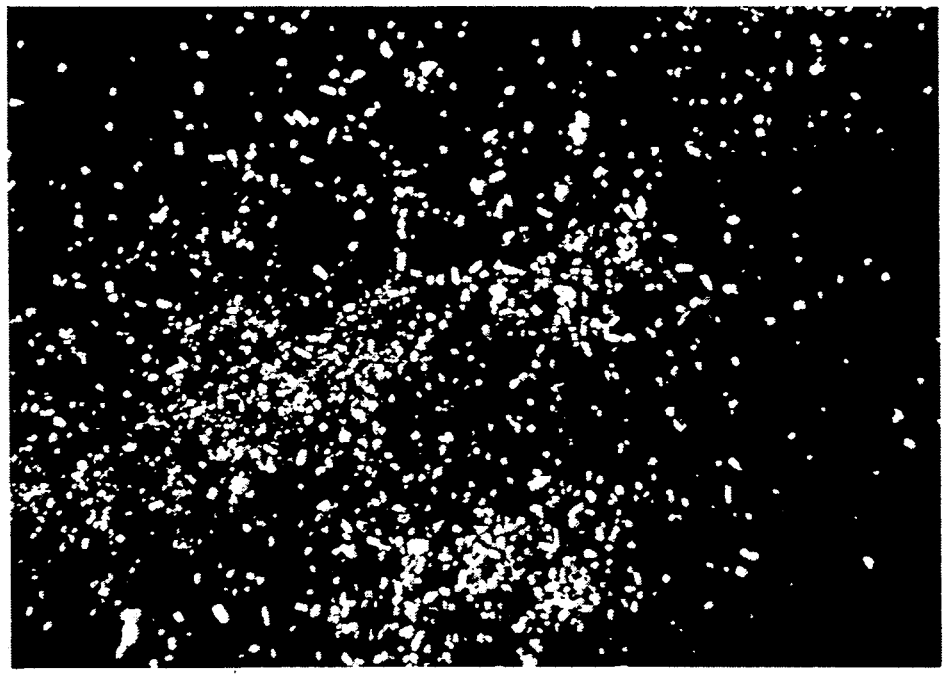
FIG. 1 Fibrous nitrocellulose of prior art.

FIG. 1 This is a photograph of the prior art fibrous nitrocellulose which is manufactured and sold by Aqualon a Hercules Incorporated Co.

Figure 2:
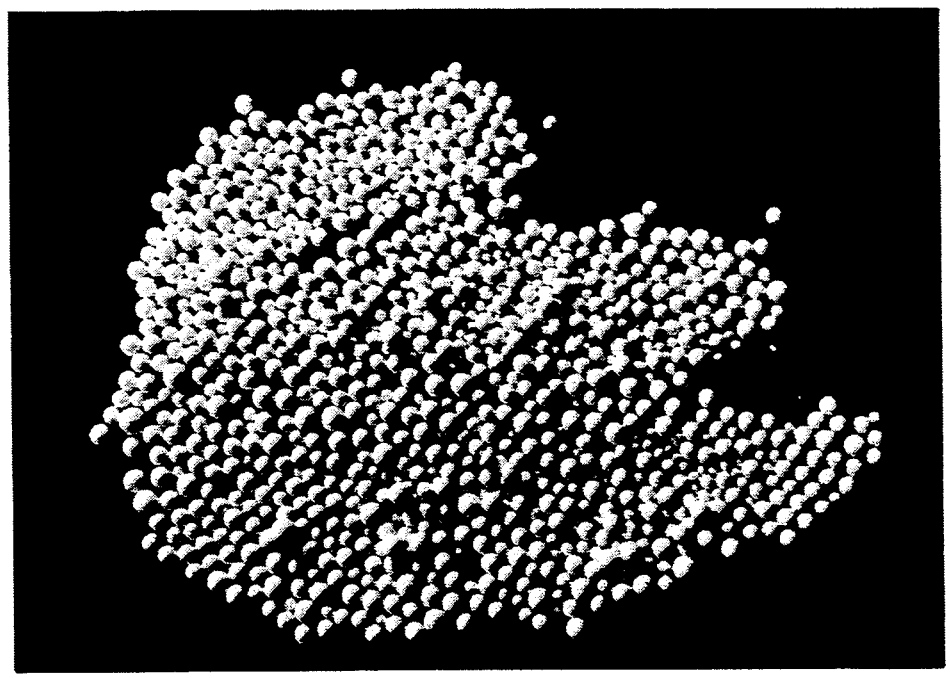
FIG. 2 Spheroid nitrocellulose of the invention.

FIG. 2 This is a photograph of the spheroid nitrocellulose of the invention produced from the FIG. 1 starting material.

FIG. 3 This phase diagram illustrates how solvent-/cosolvent ratios would differ with two different grades of nitrocellulose, indicated by the solid and dotted lines. In the upper portion of the diagram it can be seen that pure ethanol can be either a solvent or a cosolvent depending on the grade of nitrocellulose used, while ethanol 2B is a solvent for both.

While being illustrated in more detail by the examples which follow, the process of the invention can be summarized by the following steps.

The first step of a preferred process is to dry water wet nitrocellulose until the moisture content falls within 4.5 to 5.5% by weight based on the weight of the nitrocellulose. Continuous monitoring of the material with automatic sensing can be used to avoid over drying.

The second step of the process is to apply a solvent-/cosolvent mixture to the 4.5 to 5.5% moisture nitrocellulose. Spraying is a preferred application technique. Reference can be made to a phase diagram such a FIG. 3 to determine the correct solvent/cosolvent ratio to be used for the spray application. Isopropanol/isopropyl acetate is a preferred solvent/cosolvent mixture for softening and binding the nitrocellulose.

The third step of the process is to place this material in an apparatus which can apply bilateral force to the softened nitrocellulose comprising specified moisture and absorbed solvent/cosolvent mixture. Such an apparatus is an orbital shaker. With a 150 to 200 g sample it can take from 10 to 30 minutes for conversion to be accomplished.

In detail the advantages provided by the spheroid nitrocellulose shown in FIG. 2 over the previously produced material shown in FIG. 1 are as follows:

A. A bulk density increase of up to 50% allows more material to be packed in a drum.

B. The free-flowing characteristics allow the drums to be unloaded by tilting.

C. The product is dust-free so that product yield and housekeeping are improved.

D. Faster dissolution in lacquer formulation increases productivity.

E. Slower burning indicates the product is safer to store and handle.

The apparatus used for fibrous to spheroid conversion was a laboratory bottle shaker in which the moisture and solvent/cosolvent nitrocellulose softened material was placed in glass bottles with paper-lined lids to prevent static electricity generation. The shaker is a rack with eight (8) multiple arms radially mounted on top of an eccentric drive unit. Each arm is equipped with a bottle holder which can securely hold a bottle up to 10 cm in diameter. The drive provides orbital motion to each bottle at approximately 300 cycles per minute. The two-dimensional motion has vertical oscillation of 6.3 cm and horizontal oscillation of 1.3 cm amplitudes.

The invention has Industrial Applicability for the production and use of nitrocellulose for coatings and finishes. The following examples illustrate the practice of the invention without being limiting.

EXAMPLE 1

Water-wet nitrocellulose with a moisture content of about 30% was placed in a brass container having screens on the top and bottom and dried with a hot air dryer. After 90 minutes a sample of 50 g was obtained which was determined to have a moisture content of approximately 5% by gravametric analysis.

This procedure was repeated with five different grades of nitrocellulose characterized as follows:

| Viscosity Type | Degree Polymerization | Intrinsic Viscosity |
|---|---|---|
| RS ⅛ (18-25 mPa · s) | 156 | 0.48 |
| RS ¼ (30-35 mPa · s) | 187 | 0.56 |
| RS ½ | 215 | 0.67 |
| RS 1 | 292 | 0.90 |
| RS 5-6 | 600 | 1.84 |

Wetting agents of different isopropyl acetate concentrations in isopropyl alcohol were made up for different viscosity grades of nitrocellulose by mixing the appropriate amounts of acetate and alcohol as follows:

| Viscosity Type | Acetate in Mix (parts) | Alcohol in Mix (parts) | Resultant Mix in Alcohol (Wt. %) |
|---|---|---|---|
| RS ⅛ (18-25 mPa · s) | 5 | 95 | 5 |
| RS ¼ (30-35 mPa · s) | 8 | 92 | 8 |
| RS ½ | 10 | 90 | 10 |
| RS 1 | 14 | 86 | 14 |
| RS 5-6 | 18 | 82 | 18 |

The dried nitrocellulose was placed in a 16 oz. (5.7 cm D×15.9 cm L) bottle and sprayed with the wetting agent to 70% total solids.

The acetate-alcohol-wetted nitrocellulose was then placed on the shaker for ten to thirty minutes of mechanical conditioning to achieve the following bulk densities:

| Viscosity Type | Shaking Time Minutes | Bulk Density (dry basis) | | |
|---|---|---|---|---|
| | | lb/ft³ | g/cm³ | |
| RS ⅛ (18-25) | 0 | 29.48 | 0.47 | |
| | 10 | 36.74 | 0.59 | (with 5% acetate in alcohol) |
| RS ¼ (30-35) | 0 | 27.12 | 0.43 | |
| | 10 | 32.69 | 0.52 | (with 8% acetate in alcohol) |
| RS ½ | 0 | 26.01 | 0.42 | |
| | 20 | 31.61 | 0.51 | (with 10% acetate in alcohol) |
| RS 1 | 0 | 19.55 | 0.31 | |
| | 25 | 29.73 | 0.48 | (with 14% acetate in alcohol) |
| RS 5-6 | 0 | 16.25 | 0.26 | |
| | 30 | 22.58 | 0.36 | (with 18% acetate in alcohol) |

A sample of spheroid nitrocellulose produced from grade RS ⅛ (18-25) was subjected to a burn test and observed to take 90 seconds to burn compared to 60 seconds for untreated control material.

EXAMPLE 2

Nitrocellulose with 4.5 to 5.5% moisture was treated with solvent/cosolvent mixtures of methanol/butanol; ethyl acetate/isopropanol; methyl ethyl ketone/ethanol, etc. as selected from the phase diagram of FIG. 3 following the procedure illustrated in Example 1. In all case, spheroid nitrocellulose was produced with up to thirty minutes bilateral shaking.

EXAMPLE 3

A test was repeated as in Example 1 except that all eight bottles contained the same identical compositions. Testing of the eight resulting samples showed reproducable results for the production of spheroid nitrocellulose with improved flow and extended burn time.

EXAMPLE 4

Test lacquer formulations were prepared using samples of the materials illustrated in FIG. 1 and FIG. 2. Whereas it took more than an hour for the prior art nitrocellulose to dissolve to form a clear lacquer, it required only thirty minutes to prepare a clear lacquer using the spheroid nitrocellulose of the invention.

EXAMPLE 5

RS ⅛ (18–25) and RS ¼ nitrocellulose was tested for water content toleration. Starting with about 30% moisture, the samples were dried to various moisture levels using a hot-air blower. The samples were sprayed with isopropyl acetate and ispropyl alcohol as in Example 1. The wetted samples were then mechanically conditioned by agitating on a shaker. All samples were wetted to 70% total solids prior to shaking. The finished products were spheres in various sizes. Results of the experiment are tabulated in Table 1.

TABLE 1

Results on Agglomeration as a Function of Nitrocellulose Content

| NC Type | Wetting Agent | Moisture Content | Product Appearance |
|---|---|---|---|
| RS ⅛ (18–25) | 5% IPAC, 95% IPA | 0 | 2 mm size balls |
| | 5% IPAC, 95% IPA | 3 | 2 mm size balls |
| | 5% IPAC, 95% IPA | 7 | 3 mm size balls |
| | 5% IPAC, 95% IPA | 10 | 2 mm size balls |
| | 5% IPAC, 95% IPA | 12 | big, gummy lumps |
| | 8% IPAC, 92% IPA | 12 | big, gummy lumps |
| RS ¼ | 10% IPAC, 90% IPA | 0 | 1 mm size balls |
| | 10% IPAC, 90% IPA | 8 | 2 mm size balls |
| | 10% IPAC, 90% IPA | 10 | 2 mm size balls |
| | 10% IPAC, 90% IPA | 12 | big, gummy lumps |
| | 12% IPAC, 88% IPA | 12 | big, gummy lumps |

IPAC - isopropyl acetate
IPA - isopropyl alcohol

Mixtures comprised of solvents and co-solvents/diluents were used to wet the nitrocellulose prior to shaking. Again the nitrocelluloses used in this experiment were RS ⅛ (18–25) and RS ¼. The solvents selected were common esters and ketones. The balance of the formulation was either alcohols (generally regarded as co-solvent for nitrocellulose) or common organic solvents (aliphatic or aromatic, generally regarded as diluents for nitrocellulose). After wetting with the appropriate solvent system, the nitrocellulose was subjected to the 2-dimensional shaking motion and the results are summarized on Tables 2.

TABLE 2

Results on Agglomeration as a Function of Wetting Mixture Composition for RS ⅛ (18–25) Nitrocellulose

| NC Type | Wetting Agent | Moisture Content | Product Appearance |
|---|---|---|---|
| RS ⅛ (18–25) | 100% IPA | 7 | 2 mm size balls |
| | 100% 2B | 7 | 3 mm size balls |
| | 5% EAC, 95% IPA | 7 | 2 mm size balls |
| | 5% IPAC, 95% IPA | 10 | 3 mm size balls |
| | 5% IPAC, 90% amyl alc. | 12 | 2 mm size balls |
| | 8% IPAC, 92% IPA | 12 | Powderous, no agglomeration |
| RS ¼ | 10% acetone, 90% IPA | 7 | 2 mm size balls |
| | 10% acetone, 98% 2B | 3 | 2 mm size balls |
| | 10% acetone, 90% amyl alc. | 3 | 2 mm size balls |
| | 10% acetone 90% toluene | 7 | Powderous, no agglomeration |
| | 10% acetone 90% hexane | 7 | Powderous, no agglomeration |
| | 10% acetone 90% hexane | 0 | Powderous, no agglomeration |
| | 10% MEK 90% IPA | 7 | 2 mm size balls |
| | 10% cellosolve 90% IPA | 7 | 1 mm size balls |
| | 10% cellosolve 90% toluene | 7 | Powderous, no agglomeration |

IPAC - isopropyl acetate
IPA - isopropyl alcohol
EAC - ethyl acetate
MEK - methyl ethyl ketone
2B - 92.5% ethyl alcohol The results from Table 2 indicated that agglomeration can be achieved by wetting nitrocellulose with a mixture comprised of an active solvent and a co-solvent. However, agglomeration is not possible using a solvent/cosolvent mixture.

What is claimed is:

1. A spheroid nitrocellulose prepared from dried water-wet fibrous nitrocellulose treated with a solvent, characterized in that water-wet nitrocellulose dried to a moisture content of 2.5 to 10% is treated with a solvent-/cosolvent mixture and densified to a nonfibrous from via bilateral agitation to produce a free flowing spheroid nitrocellulose having a slower burn rate than alcohol-wet densified nitrocellulose.

2. The spheroid nitrocellulose of claim 1 prepared from a fibrous nitrocellulose with a moisture content of 4.5 to 5.5% wherein during drying the mixture content of the nitrocellulose is continuously monitored with automatic sensoring to avoid over drying.

3. The spheroid nitrocellulose of claim 2 where the solvent is isopropyl acetate.

4. The spheroid nitrocellulose of claim 3 where the cosolvent is isopropyl alcohol.

5. A process for preparing a free flowing densified spheroid nitrocellulose from a water-wet fibrous nitrocellulose having a degree of nitration greater than 10.8% comprises the steps:
 (1) drying a water-wet nitrocellulose with continuous monitoring to obtain a moisture content of 4.5 to 5.5% by weight based on the weight of nitrocellulose;
 (2) spraying the dried nitrocellulose with a mixture of isopropyl acetate and isopropanol to soften and bind the nitrocellulose; and
 (3) agitating the nitrocellulose in an explosion proof apparatus for a time sufficient to convert the nitrocellulose from a loose fibrous form to a densified spheroid form;

wherein the resulting spheroid nitrocellulose has a burn time of 80 seconds or longer.

6. The process of claim 5 where in step (1) the drying takes place in a brass container.

7. The process of claim 5 where in step (2) on a weight basis from 5 to 18 parts isopropyl acetate are mixed with from 82 to 95 parts isopropylalcohol to prepare the mixture.

8. The process of claim 5 where in step 3 the nitrocellulose is placed on a glass container and agitated via a mechanical shaker.

9. The process of claim 8 where the mechanical shaker is an orbital shaker.

* * * * *